United States Patent [19]
Woo

[11] 3,818,702
[45] June 25, 1974

[54] OVERRIDE CONTROL FOR A DIVERTER VALVE

[75] Inventor: Ji Yah Woo, South Bend, Ind.

[73] Assignee: The Bendix Corporation, South Bend, Ind.

[22] Filed: Feb. 15, 1973

[21] Appl. No.: 332,971

[52] U.S. Cl. ................. 60/290, 60/307, 60/347, 91/1, 91/6, 303/11
[51] Int. Cl. .... F15b 13/04, F02b 75/10, B60t 13/18
[58] Field of Search ............ 60/347, 289, 290, 307, 60/428, 430; 91/1, 6; 303/4, 11

[56] References Cited
UNITED STATES PATENTS

| | | | |
|---|---|---|---|
| 2,057,707 | 10/1936 | Carroll | 303/4 |
| 2,173,819 | 9/1939 | Boldt | 303/11 |
| 3,369,364 | 2/1968 | Ayers | 60/307 |
| 3,392,523 | 7/1968 | Hyde | 60/290 |
| 3,434,388 | 3/1969 | Julow | 91/6 |
| 3,747,337 | 7/1973 | Gardner | 60/547 |
| 3,768,366 | 10/1973 | Grabb | 91/6 |

*Primary Examiner*—Douglas Hart
*Attorney, Agent, or Firm*—Leo H. McCormick, Jr.; William N. Antonis

[57] ABSTRACT

An override control associated with a diverter valve in an emission control system for directing air from a pump to a servomotor in response to a sensed braking potential. A differential pressure sensor in the override control will maintain the directed air at a predetermined pressure to provide a uniform predictable output from the servomotor.

12 Claims, 1 Drawing Figure

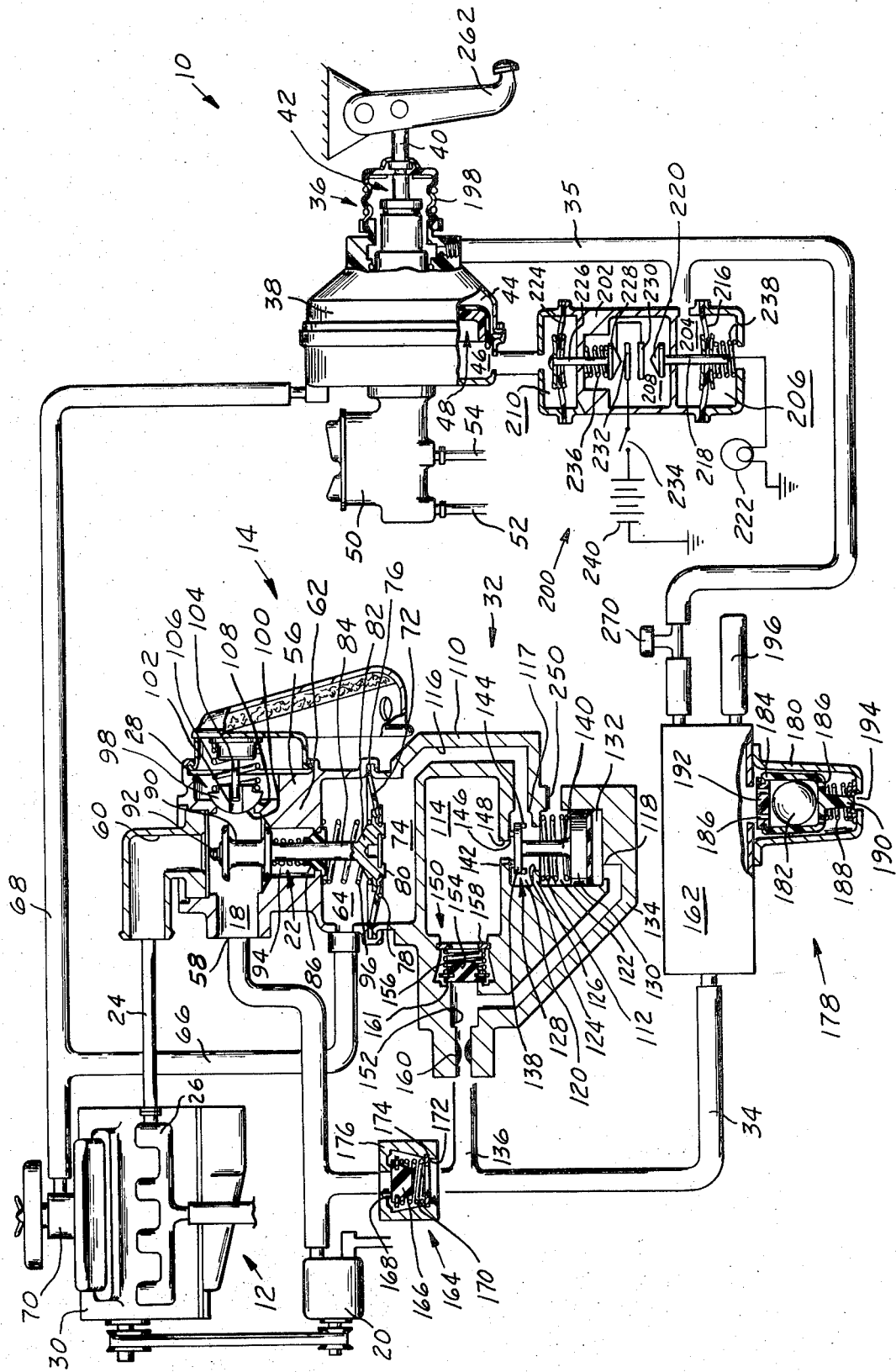

OVERRIDE CONTROL FOR A DIVERTER VALVE

BACKGROUND OF THE INVENTION

Motor vehicles presently being produced in the United States are required by law to be equipped with emission control devices. The emission controls presently available require an air pump to circulate unburned gases through a reaction apparatus wherein air pollutants are removed or reduced. The air pump will continually deliver a supply of fresh air into the exhaust manifold during acceleration of the vehicle. However, if the throttle is closed as during a deceleration, a rich mixture of unburned gases and fresh air will be carried into the exhaust manifold. The heat from the exhaust manifold would normally be sufficient to ignite the mixture and cause an unwanted combustion. Accordingly, a diverter valve is attached to the pump and controlled by the throttle to vent the output from the pump into the atmosphere during periods of deceleration and thereby reduce the possibility of internal combustion in the emission controls apparatus.

The output of the pump as shown in U.S. Patent application Ser. No. 332,857, filed Feb. 15, 1973, and incorporated herein by reference, can be vented to a storage tank and effectively utilized to operate a power braking system. As shown in this incorporated application, a solenoid activated with each operation of a brake light switch will positively control the directing of the vented air supplied by the pump. This vented air, which is simultaneously communicated to an air/vacuum pressure differential operated servomotor along with vacuum available from the intake manifold, can effectively increase the output force of the servomotor without a change in the physical dimensions thereof. However, in some instances the use of a solenoid from a cost standpoint cannot be justified.

SUMMARY OF THE INVENTION

I have devised an automatic override means for use with a diverter valve means of an emission control system to charge up a storage reservoir with air under pressure in response to an operational condition. The override means is connected to a servomotor in a power braking system and the storage reservoir for monitering a potential braking power assist potential to obtain an operational pressure signal. The override means will communicate the pressure signal to an operational control and in response to a predetermined monitered condition nullify the operation of the diverter valve means by directing the output of the pump into the storage reservoir. Upon increasing the air pressure in the storage reservoir to a predetermined level, the override means is switched to a position where the pressure signal is dissipated into the atmosphere and the operational control of the diverter valve means returned to regulation of the air supplied to the emission control system.

It is therefore the object of this invention to provide an override control means for nullifying the operation of a diverter valve means of an emission control apparatus by diverting air under pressure into a power braking system in response to a sensed braking potential.

It is another object of this invention to provide a diverter valve means with a pneumatically operated override control means responsive to a monitered braking potential in a servomotor in a power braking system.

It is still another object of this invention to provide an operational override control means for directing the output from a pump in an emission controls system to a power braking system in response to a sensed braking potential.

It is still a further object of this invention to provide a means for utilizing the output from an air pump upon being diverted momentarily from an air operated apparatus.

It is still another object of this invention to provide an override control means for a diverter valve with warning means to indicate to an operator a potential braking deficiency if a rapid deceleration situation develops.

These and other objects will be apparent from reading the specification and viewing the drawing.

BRIEF DESCRIPTION OF THE DRAWING

The drawing schematically illustrates a power braking system connected to an emission control system through a diverter valve means.

DETAILED DESCRIPTION OF THE PREFERRED EMBODIMENT

In the drawing a power braking system 10 is connected to an emission control system 12 through a diverter valve means 14. The diverter valve means 14 will regulate the flow of air under pressure communicated through conduit 16 to flow into chamber 18 from pump 20. A control means 22 will either direct the air under pressure through conduit 24 into the exhaust manifold 26 for supplying an operative force for the emission control system or past relief valve means 28 into the atmosphere in response to an operational condition in the engine 30. In response to a pneumatic signal from an override control means 32, the operation of the control means 22 is nullified and the output of air under pressure from the pump 20 is carried through passageway 34 to an enclosure means 36 on a servomotor 38. Upon movement of the push rod 40, poppet valve means 42 is activated to allow the air under pressure present in the enclosure means 36 to enter the rear chamber 44 and create a pressure differential across wall means 48 with vacuum in the front chamber 46. This pressure differential will move the wall means 48 to provide an energizing force to pressurize hydraulic fluid in the master cylinder 50. The pressurized hydraulic fluid will be carried through brake lines 52 and 54 to the activated individual wheel cylinder in the wheel brakes of the vehicle.

In more particular detail the divert valve means 14 includes a housing 56 having an entrance port 58 connecting the flow chamber 18 therein to the conduit 16 and an exit port 60 joined to the conduit 24 going to the exhaust manifold 26.

A wall 62 in the housing 56 separates the flow chamber 18 from a vacuum chamber 64. The vacuum chamber 64 is connected by a conduit 66 to conduit 68. The conduit 68 connects the servomotor 38 with the intake manifold 70 of the vehicle to provide a source of vacuum for evacuating air from both the front chamber 46 and vacuum chamber 64.

The control means 22 includes a diaphragm 72 with an external periphery 76 attached to the housing 56 for separating the vacuum chamber 64 from a control chamber 74. The internal periphery 78 of the diaphragm 72 is sandwiched between a cover plate 80 and the head 82 of a shaft 84. The shaft 84 passes through wall 62 into the flow chamber 18. A guide and sealing means 86 aligns the shaft with the exit port 60. A spool shaped poppet 90 is slidably retained on the end of the shaft 84 adjacent the exit port 60 by keeper member 92. A first spring 94 urges the spool shaped poppet 90 against the keeper and a second spring 96 acts on the head of the shaft to hold the spool shaped poppet 90 away from the exit port 60.

The relief valve means 28 includes a poppet 98 with a curved face 100 and an axial bore 102. A guide 104 is secured to the housing 56 for locating a spring 106 adjacent the poppet 98. The spring 106 will urge the poppet 98 against a port 108 in the housing 56.

The control chamber 74 is responsive to the air pressure transmitted through conduit 116 from the override control means 32.

The override control means 32 includes a housing 110 having a stepped axial bore 112 located therein to connect a power chamber 114 through a transition chamber 120 with the control chamber 74. The transition chamber 120 in turn is connected to an atmospheric chamber 122 by a second port 124 in a wall 126 in the housing 110. A shuttle means 128 located in the stepped axial bore 112 will control the communication of air either at atmospheric pressure or under pressure through a third port 117 into the conduit 116 to the control chamber 74.

The shuttle means 128 includes a first piston 130 located between the second port 126 and the first port 118 to form a sensing chamber 132 therebetween for monitoring the pressure of air communicated through branch 134 of passageway 136.

A stem 140 extends from the first piston 130 through the second port 124 into the transition chamber 120. A second piston 138 on the end of the stem 140 is located in the transition chamber 120. The second piston 138 has a first seating surface 142 which is adapted to contact the wall 146 surrounding a fourth port 148 and a second seating surface 144 which is adapted to contact the wall 126 surrounding the second port 124.

A check valve 150 is located in branch 152 of the passageway 136 adjacent the power chamber 114. The check valve has a poppet 154 which is resiliently positioned against a seat 161 by a spring 156. The spring 156 is held in place by a retainer ring 158. The branch 152 has a larger cross sectional area than branch 134 in order to provide a flow path into the power chamber with less resistance than into the sensing chamber 132. This will allow the power chamber 114 and the sensing chamber 132 to be substantially pressurized simultaneously due to their size differences. A restriction 160 is located in the passageway 136 between the branch 152 and the passageway 34 which joins the pump 20 to the servomotor 38. The passageway 34 includes a storage reservoir 162 wherein a sufficient quantity of air under pressure is retained to permit several brake applications with power assist by the servomotor 38.

The air under pressure in passageway 34 and storage reservoir 162 is maintained therein by a check valve 164 which prevents backflow into the supply conduit 16 from the pump 20. The check valve 164 has a poppet 166 held against a seat 168 by a spring 170. The spring 170 is held in position by a snap ring 172 mating with a groove 174 in the body 176 in the check valve 164.

Since the pump 20 draws air from the atmosphere occasionally during pressurization, water vapor will develop. When the diverter valve means 14 is operating to send air into the emission controls, the water vapor will not substantially affect the operation thereof because the water vapor will be evaporated in the exhaust manifold 26. However, when the operation of the diverter valve means is interrupted and air under pressure passes through check valve 164 into the storage reservoir 162, the build-up of water vapor therein could substantially impair the operation of the servomotor 38. Therefore, a float control valve means 178 is located along the bottom of the storage reservoir 162.

The water vapor will condense and flow into well 180. As the condensation builds-up, a ball 182 will float upward and contact a cage housing 184. The cage 184 has a plurality of openings 186 located therein to permit the water in the well 180 to freely flow into contact with the ball 182. Spring 188 surrounds a plug 190 on the cage housing 184 to balance the effect of air under pressure acting on the closure surface 192 trying to close the opening 194 in the well 180. Upon ball 182 contacting closure surface 192, the cage 184 will be moved to disengage plug 190 from opening 194. The air under pressure in the storage reservoir will now act on the condensation in the well and push the water through the opening 194. Thus, the passageway 34 and storage reservoir will automatically be relieved of unwanted water vapor.

The storage reservoir 162 includes a relief valve means 196 for venting air to the atmosphere when the pressure of the air therein reaches a predetermined value. This will normally be between 10-20 psi since ballooning of the cylindrical bellows 198 can occur when continually communicated with air above 20 psi.

The conduit extension 35 of passageway 34 from the storage reservoir 162 includes a warning means 200 for indicating the possibility of a low pressure differential in the servomotor 38. The warning means 200 includes a housing 202 with a first sensing chamber 204 connected to conduit 35, a first atmospheric chamber 206 and a switching chamber 208 and a second sensing chamber 210 connected to the front chamber 46 of the servomotor 38 and a second atmospheric chamber 212.

A first diaphragm 216 separates the first sensing chamber 204 from the first atmospheric chamber 206. The diaphragm 216 is attached to a first shaft 218 which extends into the switching chamber 208. The shaft has a contact 220 which is connected to an indicator 222, shown as a light. However, an audio device will work and at times may be preferable.

A second diaphragm 224 separates a second sensing chamber 210 from a second atmospheric chamber 212. The second diaphragm is attached to a second shaft 226 which extends into the switching chamber 208. The second shaft 226 has a contact 228 which is connected to a contact 230 located in the switching chamber 208. A contact 232 located in the switching chamber 208 is connected to the ignition switch 234.

MODE OF OPERATION OF THE PREFERRED EMBODIMENT

Upon closure of the ignition switch 234, the resilient means 236 will urge the contact 228 toward contact 232 in opposition to a first pressure differential created by vacuum in the sensing chamber 210 and air at atmospheric pressure in chamber 212. If the vacuum in the front chamber 46 has been replaced by air, the resilient means will be stronger than the first pressure differential allowing contact 228 to engage contact 232 and communicate an electrical current from battery 240 to contact 230.

Even without vacuum in the front chamber 46, the air under pressure in the storage reservoir 162 will be capable of providing a pressure differential with air at atmospheric pressure in the front chamber 46.

The air under pressure in the storage reservoir 162 is communicated into the first sensing chamber 204 to provide a second pressure differential with air at atmospheric pressure in chamber 206. If the second pressure differential is insufficient to overcome spring 238, contact 220 will engage contact 230, causing indicator 222 to be activated. This will alert an operator of a potential deficiency in the power brake assist if a rapid deceleration is desired.

Upon starting the engine 30, vacuum will be produced at the intake manifold 70 to evacuate the air from the front chamber 46 and the vacuum chamber 64. With vacuum in the front chamber 46, air will also be evacuated from the second sensing chamber 210 allowing the first pressure differential to be developed across the second diaphragm 224 with air at atmospheric. This first pressure differential will move the contact 228 on shaft 226 away from contact 232 to de-energize the indicator 222.

Simultaneously, with the engine running, the pump 20 will immediately start to supply air above atmospheric pressure through conduit 16 to the flow chamber 18. Spring 96 located in the vacuum chamber 64 will act on head 82 to hold the spool shaped poppet 90 on shaft 84 away from exit port 60. The vacuum being produced at the intake manifold 70 evacuates the vacuum chamber 64 through conduit 66. Air at atmospheric pressure passes through the atmospheric opening 250 into the atmospheric chamber 122 past the second port 124 into the transition chamber 120 out the third port 117 into conduit 116 before reaching the control chamber 74 in the diverter valve means 14.

During normal or a first mode operation, with air at atmospheric pressure in the control chamber 74 and vacuum in the vacuum chamber 64 an operational pressure differential will be created across the diaphragm 72. During periods of intense vacuum, such as that which develops when the accelerator pedal is rapidly released when the engine is running, the pressure force of air at atmospheric pressure acting on the diaphragm 72 will overcome spring 96 to move shaft 84. Movement of shaft 84 against spring 94 will move the spool shaped poppet 90 against the housing 56 surrounding the exit port 60. With the exit port 60 sealed, the air under pressure from the pump 20 will be vented to the atmosphere through the check valve means 28 by overcoming spring 106. However, if the air pressure in the storage reservoir 162 is below the resistive force of the spring 106, the air under pressure will flow in the passageway 34 past check valve means 164. The pressure of the air in the passageway will simultaneously flow into the storage reservoir and the passageway 136 to the override means 32.

The air in passageway 136 will flow past the restriction 160 into branch 134 and branch 152 to act on the first piston 130 and to be retained in the power chamber 114.

The force of the air under pressure will act on the first piston 130 to move the shuttle means 128 and hold the first seating surface 142 of the second piston against wall 146 to allow the air at atmospheric pressure to freely pass into the control chamber 74 from the transition chamber 120 as shown in the drawing.

If the operator rapidly applies his brakes repeatedly over a period of time by applying a force to brake pedal 262, the air above atmospheric pressure will pass from the enclosure means 36 into the rear chamber 44 to develop a braking pressure differential with the vacuum in the front chamber 46. This type of braking pressure differential will deplete the air supply in the storage reservoir 162. A corresponding air under pressure drop will be experienced in the sensing chamber 132. Since check valve 150 prevents a corresponding drop in the power chamber 114, the force acting on the face of the second piston 138 enclosed between seal 142 with the aid of spring 122 will overcome the force of the lowered pressure acting on the first piston 130. Upon moving the first piston 130, air will be forced out of the sensing chamber 132 into the branch 134 to the larger first branch 152. Check valve 150 will offer less resistance to the air from the branch 134 than the restriction 160 and therefore this air will pass into the power chamber 114. Without any resistance from the first piston 130 the air under pressure in the power chamber will seat the second surface 144 on the wall 126 to interrupt atmospheric communication through the second port 124. The air under pressure can now flow from the power chamber 114 through the transition chamber 120 and into the conduit 116 connected to the control chamber 74. With vacuum in the vacuum chamber 64 and air above atmospheric pressure in the control chamber, an override pressure differential across the diaphragm or wall means 72 will move the shaft 84. As the shaft 84 moves, spring 94 will seat to close the exit port 60 causing the air under pressure to be re-directed to the storage reservoir.

When the pump 20 has built the pressure of the air in the storage reservoir to a predetermined level, the force of the air acting on the first piston 130 will overcome spring 122 and the force of the air in the power chamber acting on the second piston 138 to move the face on the second piston to seal the fourth port 148 and open the second port 126. With the second port 126 opened, the air above atmospheric pressure in the control chamber 74 will flow through the transition chamber 120 and escape to the atmosphere. Thus, the operation of the diverter valve means 14 will again be controlled by the operational conditions in the engine.

In the event that pump 20 is inoperative, an atmospheric vent valve 270 is connected to segment 35 of the passageway 34 to allow air to enter the enclosure means 36. This will allow a power assist to be developed with the vacuum in the front chamber 46.

Thus, a power assist from a servomotor can be developed from these three modes of operation: (1) vacuum in the front chamber and air above atmospheric pressure in the rear chamber; (2) vacuum in the front chamber and air at atmospheric pressure in the rear chamber; and (3) air at atmospheric pressure in the front chamber and air above atmospheric pressure in the rear chamber. By providing these alternatives the possibility of a complete failure of the servomotor is greatly reduced and the safety of the operator of the vehicle enhanced.

I claim:

1. In a vehicle having a servomotor for providing an operational force to activate a power braking system and a pump for providing a supply of air under pressure to operate an emission control system, diverter valve means for directing said supply of air away from said emission control system in response to an operational condition in the engine of said vehicle, the improvement comprising:

override control means connected to said diverter valve means and said servomotor for interrupting the supply of air to the emission control system, independently of said operational condition in the engine, and causing the supply of air to be communicated to the servomotor as an operational power supply in response to a sensed braking potential.

2. In the vehicle, as recited in claim 1, wherein said override control means comprising:

a housing having a bore therein, said bore having a first port, a second port, a third port, and a fourth port, said first port and said fourth port being connected to a passageway joining the servomotor to the pump, said second port being connected to the atmosphere, and said third port being connected to the diverter valve means; and shuttle means responsive to the supply of air under pressure communicated to the first and fourth ports for selectively allowing air to freely flow in through the second port and out the third port to provide an operational control for the diverter valve means in a first mode of operation and for allowing air under pressure to flow in through the fourth port and out the third port to nullify the effect of the operational control on the diverter valve means to permit the output supply of air from the pump to be directed into the servomotor in a second mode of operation.

3. In the vehicle, as recited in claim 2, wherein said shuttle means includes:

a first piston located in said bore for separating the first port from the second port to form a sensing chamber therebetween for monitoring the pressure of the air in said passageway; and a second piston connected to said first piston and located in said bore between said fourth port and a wall in the housing separating the second port from the third port, said wall and first piston forming an atmospheric chamber in the bore adjacent the second port, said wall and the housing forming a transition chamber adjacent the third port, said first piston having a larger area exposed to the pressure of the air in said passageway than said second piston to develop a force for seating the second piston on the housing surrounding the fourth ports to maintain said first mode of operation.

4. In the vehicle, as recited in claim 3, wherein said override control means further includes:

flow control means in a first branch passage of said passageway for preventing backflow of the air under pressure communicated to the fourth port by maintaining a uniform pressure force on said second piston which opposes a varying pressure force on said first piston created by depletion of said air supply in the servomotor.

5. In the vehicle, as recited in claim 4, wherein said shuttle means further includes:

resilient means located in said atmospheric chamber for providing additional opposition to movement of said first piston by the air under pressure in the sensing chamber.

6. In the vehicle, as recited in claim 5, wherein said housing further includes:

a power chamber located between said flow control means and said fourth port for retaining a sufficient quantity of air under pressure to initially establish said second mode of operation.

7. In the vehicle, as recited in claim 5, wherein said override control means further includes:

a restriction located in said passageway adjacent said first branch for controlling the rate at which the air supply under pressure will be communicated to said power chamber.

8. In the vehicle, as recited in claim 7, wherein said housing further includes:

a second branch passage connected to the first port and the second branch passage between said flow control means and said restriction, said first branch passage having a larger sectional area than said second branch passage, said uniform pressure force acting on said second piston upon said depletion of the air supply in the sensing chamber to move said first piston in the bore and force air out the first port into the second branch passage past the flow control means and into the control chamber to aid in seating the second piston on the wall surrounding the second port to establish the second mode of operation.

9. In the vehicle, as recited in claim 8, wherein said override control means further includes:

a storage reservoir located in said passageway for retaining a quantity of the air supply from the pump in said second mode to increase the pressure of the air therein, said restriction allowing the increase in pressure to gradually be communicated to the first and second branch passages, said increase in pressure in the sensing chamber acting on the first piston to move the second piston and seal the fourth port and re-establish the first mode of operation.

10. In the vehicle, as recited in claim 9, wherein said override control means further includes:

float control valve means located on the bottom of said storage reservoir for removing condensation therefrom; and relief valve means attached to said storage reservoir for limiting the pressure of said air from the pump to a predetermined value.

11. In the vehicle, as recited in claim 10, wherein said override control means further includes:

warning means connected to said storage reservoir and said servomotor means for indicating a potential operational pressure differential in the servomotor below a predetermined level to alert an operator of a potential braking deficiency in rapid deceleration.

12. Override means connected to a diverter valve in an emission control system of a vehicle for directing air under pressure into a reservoir supplying an operational fluid to a servomotor of a power braking system in response to a predetermined fluid pressure therein, said override means comprising:

a housing having a control chamber, a transition chamber, an atmospheric chamber, and a sensing chamber located therein, said control chamber and said sensing chamber being connected by a first passageway, said first passageway being connected to a second passageway downstream from said control chamber, said first passageway having a larger sectional area than said second passageway, said second passageway being in communication with the fluid under pressure in the reservoir, said transition chamber being connected to said diverter valve, said control chamber, and said atmospheric chamber;

shuttle means having a first face located in said sensing chamber and a second face located in said transition chamber, said first face having a larger area than said second face, said fluid under pressure acting on said first face in opposition to said fluid under pressure acting on said second face to prevent communication between said transition chamber and said control chamber and allow air from the atmospheric chamber into the transition chamber;

restriction means located in said second passageway for regulating the rate by which the fluid under communication is transmitted to the control chamber and sensing chamber; and flow control means located in said control chamber for preventing backflow into said first passageway to maintain a uniform force on said second face to move the shuttle means and allow air under pressure into the transition chamber by forcing air in the sensing chamber into the control chamber to supply said diverter valve with an operational signal.

* * * * *